United States Patent [19]

Kimura

[11] Patent Number: 4,658,310
[45] Date of Patent: Apr. 14, 1987

[54] SYSTEM FOR MOVING A PINCH ROLLER IN A RECORDING AND/OR REPRODUCING APPARATUS

[75] Inventor: Takashi Kimura, Yokohama, Japan

[73] Assignee: Canon Kabushiki Kaisha, Tokyo, Japan

[21] Appl. No.: 613,602

[22] Filed: May 23, 1984

[30] Foreign Application Priority Data

| May 26, 1983 | [JP] | Japan | 58-92878 |
| May 26, 1983 | [JP] | Japan | 58-92879 |
| May 26, 1983 | [JP] | Japan | 58-92880 |

[51] Int. Cl.$^4$ .............................................. G11B 15/66
[52] U.S. Cl. ......................................... 360/95; 360/85
[58] Field of Search .................................. 360/85, 95

[56] References Cited

U.S. PATENT DOCUMENTS

| 3,660,614 | 5/1972 | Swain et al. | 360/85 |
| 4,445,154 | 4/1984 | Kihara et al. | 360/95 |
| 4,491,886 | 1/1985 | Saito et al. | 360/85 |
| 4,517,613 | 5/1985 | Shibaike et al. | 360/95 |

*Primary Examiner*—Robert S. Tupper
*Attorney, Agent, or Firm*—Toren, McGeady and Goldberg

[57] ABSTRACT

A recording and/or reproducing apparatus arranged to use a belt-shaped, record-bearing medium housed in a container which is provided with an opening, which apparatus comprises a pull-out member for pulling out the record-bearing medium from the container, a capstan for moving the pulled-out, record-bearing medium at the exterior of the container, and a pinch roller for pressing the record-bearing medium against the capstan. The pull-out member and the pinch roller are constantly spaced from each other, at least the pinch roller is movably supported by the movable member which is moved by moving means in such a manner that the pull-out member and the pinch roller are moved between their respective first position within the opening of the container and their respective second position near the capstan, and at least the position of the pinch roller relative to the movable member is controlled by control means in accordance with the moved position of the movable member while the pull-out member and the pinch roller are moved from the first position to the second position.

27 Claims, 6 Drawing Figures

SYSTEM FOR MOVING A PINCH ROLLER IN A RECORDING AND/OR REPRODUCING APPARATUS

BACKGROUND OF THE INVENTION

1. Field of the Invention

This invention relates to a recording and/or reproducing apparatus and more particularly to an apparatus in which a recording tape extracted out of a cassette is caused to travel outside the cassette for signal recording or reproduction.

2. Description of the Prior Art

For causing a recording tape to travel at a constant speed in carrying out signal recording or reproduction with an apparatus of the above-stated kind, there have been employed two methods. In one of the methods, a capstan is arranged to come behind a tape inside a cassette containing the tape when the cassette is inserted into the apparatus and a pinch roller is arranged to press the tape from outside against the capstan. In the other method, the pinch roller is arranged to be behind the tape inside the cassette when the cassette is inserted into the apparatus and to shift its position in such a way as to press the tape against the capstan which is disposed outside the cassette.

Either of the two methods for constant speed tape travel has been applied also to a video signal recording and/or reproducing apparatus called a video cassette recorder (hereinafter will be called VCR for short) which is arranged to have a magnetic recording tape extracted out of a cassette and wound around a cylinder assembly having a rotary magnetic head mounted thereon.

In accordance with the former method, however, the angle of an extracted portion of the tape tends to become acute and to increase the winding or wrapping angle of the tape relative to the pinch roller. Then, this places the tape under excessive stress.

In the case of the latter method, the shape of the opening of the cassette, the relation to the movement of other mechanisms and parts and requirement for reduction in size of the apparatus jointly present difficulty in obtaining a sufficient passage space for movment of the pinch roller. In other words, simple arrangement to allow the pinch roller to be moved by an arcuate or linear driving mechanism would cause the locations of the opening of the cassette, the tape path and other mechanisms and parts and the movement of other mechanisms and parts to be restricted by a passage space required for the movement of the pinch roller. Such restriction is impedimental to reduction in size of the apparatus. Accordingly, the latter method results in a complex passage for the movement of a driving mechanism for moving the pinch roller. This results in an increased size of the mechanism for moving the pinch roller.

Further, the latter method necessitates arrangement to stow a tape pulling-out member, the pinch roller, etc. all within a limited space of the opening of the cassette under a cassette unloading condition. The latter method, therefore, requires extremely complex structural arrangement. Besides, to prevent the tape from being damaged, the tape extracting member must be arranged to serve also as a rotating guide post. This, therefore, necessitates provision of many movable rotating guide posts. Further, after the pinch roller shifted close to the capstan, the former must be pushed against the capstan. With the mechanism for the above-stated operation arranged to be located within the above-stated limited space, the apparatus comes to require a large number of parts including many precision parts.

SUMMARY OF THE INVENTION

It is a general object of this invention to provide a novel recording and/or reproducing apparatus which is capable of solving the above-stated problem of the prior art.

It is a more specific object of the invention to provide a recording and/or reproducing apparatus which is capable of setting the path or passage of a pinch roller as desired with simplified structural arrangement.

It is another object of the invention to provide a recording and/or reproducing apparatus which is capable of permitting a pinch roller to be satisfactorily shifted by utilizing a limited space even in case where the space is extremely limited for moving the pinch roller.

It is a further object of the invention to provide a recording and/or reproducing apparatus having a novel pinch roller shifting mechanism which is capable of shifting a pinch roller within a severely limited space to greatly contribute to reduction in size of the apparatus by allowing greater latitude to the layout for other mechanisms and parts of the apparatus.

It is a still further object of the invention to provide a recording and/or reproducing apparatus wherein a path or passage for shifting a pinch roller can be set as desired to permit the pinch roller and parts related thereto to be compactly stowed within an opening provided in a cassette; therefore, the sizes of the opening of the cassette and the cassette itself can be reduced to a great extent; and the apparatus is arranged to satisfactorily permit the use of such a compact cassette having a small opening.

Under these objects and according to a preferred embodiment of the present invention embodying the aspect of the invention, a recording and/or reproducing apparatus arranged to use a belt shaped record bearing medium housed in a container which is provided with an opening, comprises:

a capstan for moving the record bearing medium at the exterior of the container; a pinch roller for pressing the record bearing medium against the capstan; movable means movably supporting the pinch roller and movable for shifting the pinch roller between a first position within the opening of the container and a second position near the capstan; and restriction means for restricting the position of the pinch roller relative to the movable means in accordance with the moved position of the movable means.

In the embodiment, the pinch roller is rotatably supported at one end of swingable means which is swingably attached at the other end thereof to a shaft planted on the movable means and the restriction means is arranged to act upon the swingable means.

As is shown in the embodiment, pull-out means for pulling out the medium from the container may include a guide roller rotatably attached to the shaft on the movable means co-axially to the swingable means.

Further, pressing or urging mans for pressing the pinch roller against the capstan can be arrangeed to act upon a portion of the swingable means to press the pinch roller to the capstan at the second position of the pinch roller.

The above and other objects and features of the invention will be apparent from the following description of a preferred embodiment thereof taken in connection with the accompanying drawings.

DETAILED DESCRIPTION OF THE PREFERRED EMBODIMENT

Figure 1:
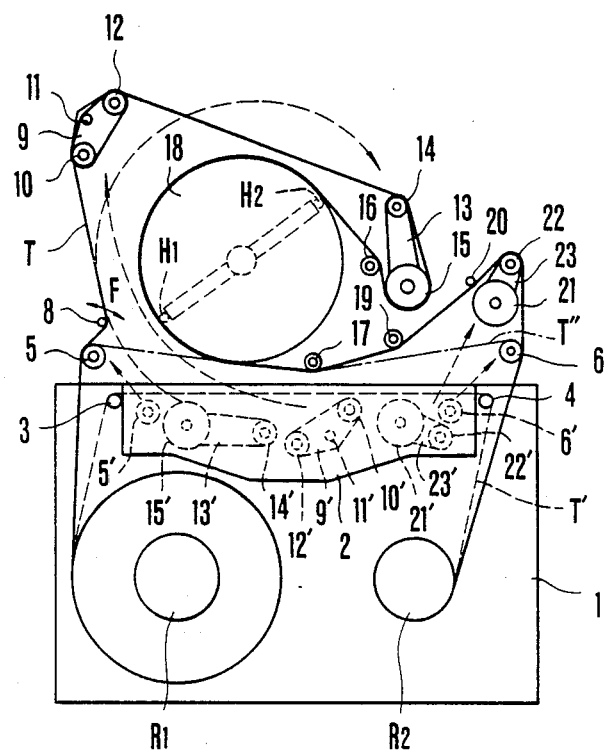
FIG. 1 shows a tape transport system in a VCR (a video cassette recorder) arranged as an embodiment of the present invention.

Referring to FIG. 1, a cassette 1 or a record bearing medium container is arranged to contain therein a magnetic tape T or a belt shaped record bearing medium. The cassette 1 is provided with an opening 2 and fixed tape guide posts 3 and 4. Reference numerals 5 and 6 denote rotating tape guide posts for pre-loading. With the posts 5 and 6 moved to the outside of the cassette 1 from their positions 5' and 6' within the opening 2 of the cassette 1, a tape path is set as represented by a one-dot chain line T". Under this condition, the tape T is set in a state of being pulled out from the cassette 1 but is not yet loaded on a cylinder assembly 18 which has recording and reproducing rotary magnetic heads H1 and H2 (hereinafter this state will be called a preload state). A tape tension regulator pin 8 is arranged to move in the directions of arrows F according to the tension of the tape T in a known manner. For example, a known brake band is wound around the periphery of a supply reel base (not shown) which is arranged to drive a tape supply reel R1. The tape tension is thus arranged to be kept constant by adjusting the brake applied to the tape supply reel base with the tension of the brake band adjusted according as the tape tension regulator pin 8 shifted in the direction of arrows F. A reference numeral R2 denotes a tape take-up reel.

A numeral 9 denotes a second loading base. Tape guide posts 10 and 12 and a slanting post 11 are provided on the second loading base 9. A first loading base 13 is provided with a tape guide post 14 and a tape loading post 15. A cylinder assembly 18 is arranged in combination with an entrance tape path control post 16 and an exit tape path control post 17. These two fixed tape path control posts 16 and 17 serve to define the winding or wrapping angle of the tape T to the cylinder assembly 18 and the height of the tape T in the direction of the width of the tape T. A capstan shaft 20 is arranged to cause the tape T to travel by having the tape T interposed in between the capstan shaft 20 and a pinch roller 21. A pinch roller arm 23 which is a swingable member carrying the pinch roller 21 rotatably at its one end. 22 is a movable tape guide post. The arm 23 is swingable on the shaft of the movable tape guide post 22 and is arranged to cause the pinch roller 21 to come into contact with and to move away from the capstan shaft 20. The tape path T', the tape extracting members and the tape loading members under an unloading condition are respectively indicated by broken lines with apostrophes affixed to their reference numerals. Under this condition, the pre-loading post 5 on the supply side and the pre-loading post 6 on the take-up side are first operated to pull out the tape T from the cassette 1 to form thereby a tape path as shown by the one-dot-chain line T". By this, the tape T is brought into the pre-load state. In a quick feeding or rewinging mode, for example, the tape T is preferably set in the pre-load state.

Following that, to wind or wrap the tape T around the cylinder assembly 18 by further pulling out the tape T from the supply reel R1, the first loading base 13 and the second loading base 9 come to move one after another. Meanwhile, the movable tape guide post 22 pulls out the tape T from the take-up reel R2 and comes to stop at the position indicated by a full line in the drawing. At that time, the pinch roller 21 also moves along with the movable tape guide post 22 to come close to the capstan shaft 20. By this, a tape loading operation is completed. Following that, the tape T begins to travel when the pinch roller 21 is pressed against the rotating capstan shaft 20 by means of a pinch roller pushing mechanism (not shown).

Figure 2:
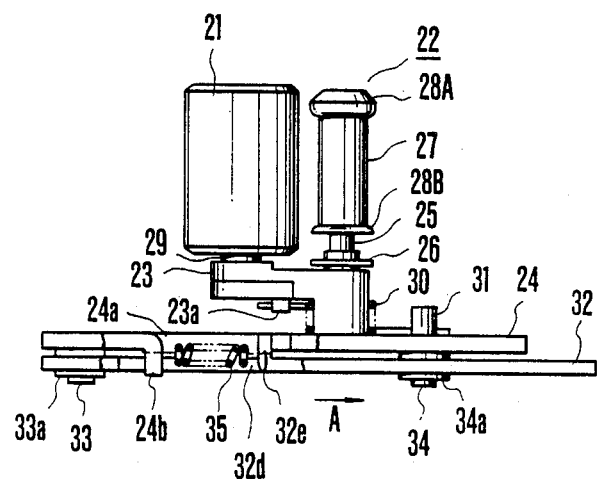
FIG. 2 is a side view showing structural arrangement for carrying a pinch roller arranged according to the invention.
Figure 3:
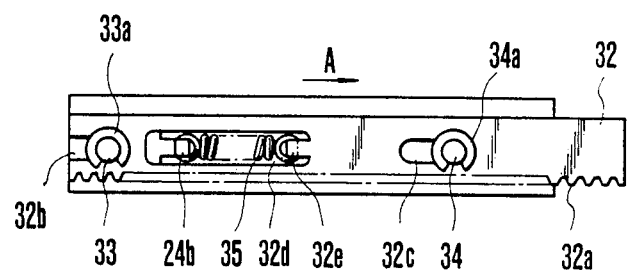
FIG. 3 is a bottom view of the pinch roller carrying arrangement of FIG. 2.

FIGS. 2 and 3 show by way of example a structural arrangement for carrying the pinch roller 21. The illustration of the pinch roller carrying arrangement includes a carrying plate 24. A guide post shaft 25 is planted on the middle part of the plate 24. An upper flange 28A, a rotation roller 27 and a lower flange 28B are mounted on the post shaft 25 to form thereby the movable guide post 22. The pinch roller arm 23 is pivotally attached at its one end to the base part of the part shaft 25 and is retained on the shaft 25 by a retaining ring 26. A pinch roller shaft 29 is disposed at the other end of the pinch roller arm 23. The pinch roller is rotatably carried by this shaft 29. A torsion coil spring 30 has one end thereof abutting on a projection 23a provided beneath the bottom of the pinch roller arm 23 and the other end thereof abutting on a positioning pin planted on the carrying plate 24. The spring 30 is thus arranged to urge the pinch roller 23 to turn counterclockwise on the guide post shaft 25 under the conditions illustrated in FIGS. 1, 4 and 5.

A movable plate 32 is arranged to form movable means together with the carrying plate 24. The movable plate 32 is slidably engaged at slots 32b and 32c with shafts 33 and 34 attached to the reverse side of the carrying plate 24. A coil spring 35 has its two ends respectively connected to a bent down part 24b continuing from an opening 24a formed in the carrying plate 24 and to a bent up part 32e continuing from an opening 32d provided in the movable plate 32. The coil spring 35 is thus arranged to urge the carrying plate 24 to move in the direction of arrow A of FIGS. 2 and 3 relative to the movable plate 32. A rack part 32a is formed on one side of the movable plate 32 and is arranged to engage with a driving gear which will be described later herein. The movable plate 32 is thus arranged to be linearly movable through this engagement between its rack part 32a and a driving gear. Further, reference numerals 33a and 34a denote retainer rings.

Figure 4:
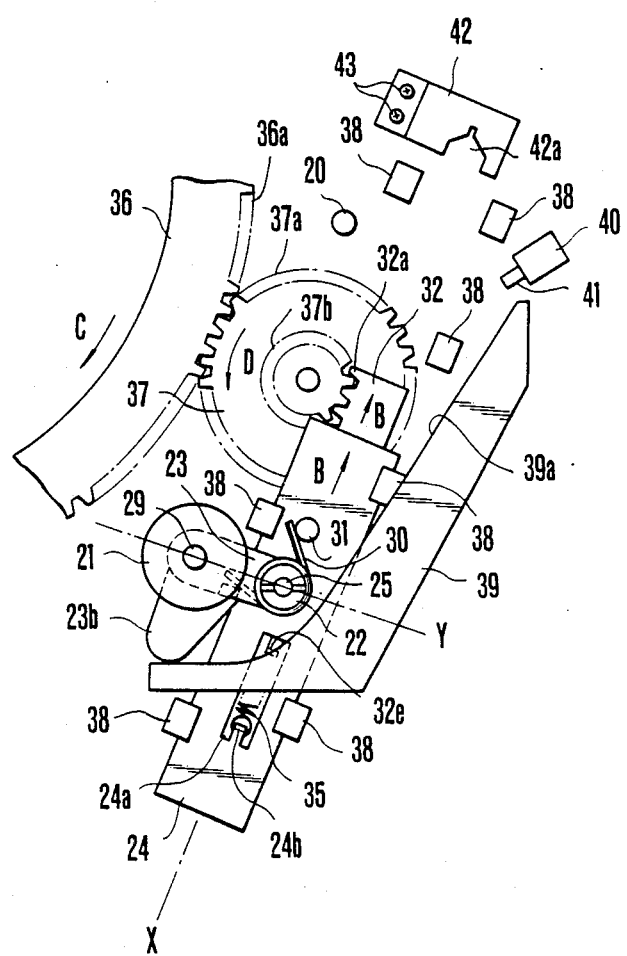
FIGS. 4 and 5 show the operation of the pinch roller carrying arrangement.
Figures 5, 6:
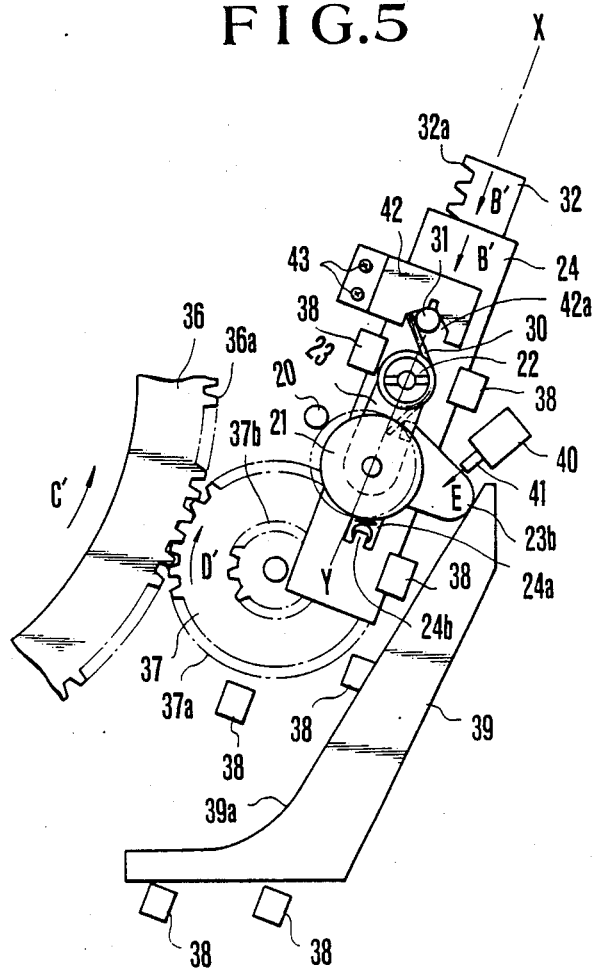
FIG. 6 is a sectional view showing the details of a guide member which is shown in FIG. 4 and is arranged to carry and guide a carrying plate.

FIGS. 4 and 5 show the operation of the pinch roller carrying mechanism. FIG. 4 corresponds to conditions where the tape T is stowed in the cassette 1 (the unload state) or slightly pulled out from the cassette (the pre-load state) while FIG. 5 corresponds to a loading completion state. Under the unload or pre-load conditions, the pinch roller 21 is located within the opening 2 of the cassette 1 as shown by a broken line 21' in FIG. 1. In this instance, as shown in FIG. 1, the pinch roller 21 is disposed in parallel with the movable tape guide post 22 (22' in this position) within the opening 2 of the cassette 1. The pinch roller 21 and the post 22 are substantially aligned in the longitudinal direction of the opening 2. Referring to FIG. 4, an axis Y connecting the pinch roller 21 and the guide post 22 is approximately perpendicular to an axis X along which the carrying plate 24 and the movable plate 32 are arranged to move.

In FIGS. 4 and 5, a turning ring 36 is arranged to shift the first loading base 13 and the second loading base 9. A loading motor (not shown) arranged to turn this turning ring 36. The ring 36 is provided with a gear part 36a which is formed along the outer circumference thereof. The gear part 36a is arranged to engage with the large diameter gear part 37a of a driving gear 37. The small diameter gear part 37b of the driving gear 37 engages with the rack part 32a of the movable plate 32. The carrying plate 24 is slidably carried and guided by a plurality of guide members 38 which are arranged on the chassis of the apparatus. FIG. 6 shows the details of the manner in which the carrying plate 24 is guided and carried by these guide members 38. Each of the guide members 38 is provided with a recess 38a. Both sides of the carrying plate 24 are carried by these recesses 38a. The carrying plate 24 is thus arranged to be slidable in the direction of arrow B as shown in FIG. 4 and also in the direction of arrow B' (opposite to arrow B) as shown in FIG. 5. The pinch roller arm 23 is urged by a spring 30 to turn counterclockwise on the guide post shaft 25. However, a sidewise projection 23b of the arm 23 abuts on the cam surface 39a of a cam member 39 which is serving as restricting means. This determines the position of the pinch roller 21. The cam member 39 is fixedly arranged.

The pinch roller carrying mechanism operates in the following manner when the mechanism is shifted from the unload state or pre-load state to the loading completion state: To load the cylinder assembly 18 with the tape T, a tape loading motor (not shown) is started to turn the turning ring 36 in the direction of arrow C of FIG. 4. With the ring 36 thus turned, the first loading base 13 and the second loading base 9 are moved from their positions 13' and 9' which are shown by broken lines in FIG. 1 and located within the opening 2 of the cassette 1 to their positions shown by full lines in FIG. 1. Meanwhile, the turning movement of the turning ring 36 is transmitted to the driving gear 37 through the engagement between the gear part 36a and the large diameter gear part 37a of the driving gear 37. The gear 37 then turns in the direction of arrow D of FIG. 4. This causes the movable plate 32 to move in the direction of arrow B of FIG. 4 through the rack part 32a which engages with the small diameter gear part 37b of the driving gear 37. Since the movable plate 32 is connected by the spring 35 to the carryrng plate 24, the carrying plate 24 also moves in the direction of arrow B according as the movable plate 32 moves. Then, the sidewise projection 23b of the pinch roller arm 23 is caused by the action of the spring 31 to move along the cam surface 39a of the cam member 39. Therefore, the position of the pinch roller arm 23 and accordingly the position of the pinch roller 21 relative to the carrying plate 24 is thus restricted or controlled and comes to shift according to the shape of the cam surface 39a. The pinch roller 21 is thus moved to a position which is in series with the movable tape guide post 22 as shown in FIG. 5. In other words, the position of the pinch roller 21 is shifted to cause the axis Y which connects the pinch roller 21 and the guide post 22 to be about in parallel with the axis X of the movement of the carrying plate 24 and the movable plate 32. Then, under a loading completion state condition which is as represented by FIG. 5, the movement of the carrying plate 24 comes to stop with the positioning pin 31 of the carrying plate 24 coming to abut on the V-shaped recess 42a of a positioning member 42 which is fixed by a screw 43. Under this condition, the pinch roller 21 and the guide post 22 are approximately in alignment with each other in relation to the portion of the tape T pulled out by the guide post 22 as shown in FIG. 1. In this instance, despite the ceasing of movement of the carrying plate 24, the loading motor does not come to stop until the turning ring 36 is somewhat over-driven or over-moved in the direction of arrow C. Therefore, the movable plate 32 comes to stop in a state of being somewhat over-driven or over-moved in the direction of arrow B through the driving gear 37. As a result of this, a spring 35 disposed between the carrying plate 24 and the movable plate 32 urges the carrying plate 24 in the direction of arrow B. At that instant, the pin 31 of the carrying plate 24 is urged by the spring 35 to impinge on the positioning member 42 to have the carrying plate 24 correctly positioned thereby. In this instance, with the pinch roller arm 23 restricted its position by the cam surface 39a of the cam member 39, the pinch roller 21 is placed at a position closely opposed to the capstan shaft 20 as shown in FIG. 5.

When an operation switch (not shown) is operated to produce an instruction to start the travel of the tape T under the loading completion state condition, a solenoid 40 is energized via a circuit (not shown). A plunger 41 comes to protrude in the direction of arrow E shown in FIG. 5. Since the carrying plate 24 is in repose at a position as shown in FIG. 5 under the loading completion state condition, the projection 23b of the pinch roller arm 23 is at a position opposed to the plunger 41. Therefore, the plunger 41 pushes the projection 23a to cause the pinch roller arm 23 to turn clockwise on the guide post shaft 25 against the force of the spring 30. This brings the pinch roller 21 into pressed contact with the capstan shaft 20 as indicated by a two-dot-chain line 21" in FIG. 5. If, at that instant, the capstan shaft 20 is rotating, the tape T then begins to travel.

The pinch roller 21 can be moved away from the capstan shaft 20 by simply de-energizing the solenoid 40. When the solenoid 40 is de-energized, the plunger 41 is retracted to the inside of the solenoid 40. The spring 30 causes the pinch roller arm 23 to turn counterclockwise until the projection 23b of the arm 23 comes to abut on the cam surface 39a of the cam member 39. The pinch roller 21 is then retracted from the capstan shaft 20 as shown by a full line in FIG. 5.

Under this condition, when an unloading operation is initiated by causing the loading motor to rotate in a direction reverse to the above-stated direction for tape loading, the turning ring 36 turns in the direction of arrow C' of FIG. 5 (the direction opposite to the arrow C of FIG. 4). The turning ring 36 thus causes the driving gear 37 to turn in the direction of arrow D' which is likewise opposite to the direction of arrow D of FIG. 4. The movable plate 32 then moves in the direction of arrow B' which is likewise opposite to the direction of arrow B of FIG. 4. This causes the carrying plate 24 to move in the direction of arrow B'. As a result, the pinch roller arm 23 is brought to the position of FIG. 4 through a movement in the direction opposite to that of the above-stated tape loading operation.

The above-stated cam surface 39a of the cam member 39 is preferably arranged to be of such a shape that the position of the pinch roller 21 relative to the movable tape guide post 22 is shifted from a parallel relation to a series relation right after the commencement of movement of the carrying plate 24 and the movable plate 32 in direction B in FIG. 4. This arrangement is advantageous for securing a space required for the movement of the pinch roller.

In the embodiment described, the position of the pinch roller 21 is arranged to be in parallel with the movable tape guide post 22 under tape unload state. This arrangement readily permits use of the cassette 1 even when the opening 2 of the cassette 1 is small. For the tape loading, the pinch roller 21 and the post 22 are arranged to be shifted from the parallel relation to the series positional relation. This arrangement requires only a small space for shifting the pinch roller 21 and the guide part 22. The invention thus does not impose much restriction on the layout of other mechanisms and parts to greatly contribute to reduction in size of the whole apparatus.

The invention is of course not limited to the arrangement of the embodiment given. Many modifications and changes are possible within the purview of the appended claims without departing from the scope and sprit of the invention. For example, the shaft 25 of the movable tape guide post 22 and the swingable shaft of the pinch roller arm 23 do not have to be arranged to coincide with each other. The guide post shaft 25 may be disposed in a suitable position on the pinch roller arm 23 or on the carrying plate 24.

What I claim:

1. A recording and/or reproducing apparatus arranged to use a belt-shaped, record-bearing medium housed in a container which is provided with an opening, said apparatus comprising:
   (a) a pull-out member for pulling out the record-bearing medium from said container;
   (b) a capstan for moving the pulled out, record-bearing medium at the exterior of said container;
   (c) a pinch roller for pressing the record-bearing medium against said capstan;
   (d) a movable member for supporting said pull-out member and said pinch roller so as to position them spacedly from each other with a constant distance, with at least said pinch roller being movably supported thereon;
   (e) moving means for moving said movable member so as to move said pull-out member and said pinch roller between their respective first position within the opening of said container and their respective second position near said capstan; and
   (f) control means for controlling at least the position of said pinch roller relative to said movable member in accordance with the moved position of the movable member while said pull-out member and said pinch roller are moved from said first position to said second position.

2. The apparatus according to claim 1, further comprising a swingable member having first and second end portions, and being swingably attached at said first end portion to said movable member and swingable about said first end portion, wherein said pinch roller is rotatably supported at the second end portion of said swingable member, and wherein said control means is arranged to control the swing action of said swingable member for controlling the position of said pinch roller relative to the moved position of said movable member.

3. The apparatus according to claim 2, wherein said control means includes at least the position of said pinch roller relative to said movable member in accordance with the moved position of the movable member, and said swingable member further has a cam follower portion for engaging with said cam surface of said cam member.

4. The apparatus according to claim 3, further comprising spring means provided between said movable member and said swingable member for urging the swingable member relative to the movable member so that said cam follower portion of the swingable member engages with the cam surface of said cam member.

5. The apparatus according to claim 4, further comprising urging means for urging said swingable member so as to press said pinch roller onto said capstan against the urging force of said spring means to engage said pinch roller with said capstan when said pinch roller is at the second position.

6. The apparatus according to claim 1, wherein said control means includes a cam member having a cam surface for controlling the position of said pinch roller relative to said movable member in accordance with the moved position of the movable member.

7. The apparatus according to claim 6, further comprising spring means provided between said movable member and said pinch roller for urging the pinch roller relative to said cam member so that the position of the pinch roller relative to the movable member is controlled in accordance with the cam surface of the cam member during the movement of the movable member.

8. The apparatus according to claim 7, further comprising urging means for urging said pinch roller so as to press said pinch roller onto said capstan against the urging force of said spring to engage said pinch roller with said capstan when said pinch roller is at the second position.

9. A recording and/or reproducing apparatus arranged to use a belt-shaped, record-bearing medium housed in a container which is provided with an opening, said apparatus comprising:
   (a) pull-out means for pulling out the record-bearing medium from said container;
   (b) a capstan for moving the pulled out, record-bearing medium against said capstan;
   (c) a pinch roller for pressing the record-bearing medium against said capstan;
   (d) a movable member for supporting said pull-out member and said pinch roller, with at least said pinch roller being movably supported thereon;
   (e) moving means for moving said movable member in such a manner that said pull-out member and said pinch roller move between their respective first position within the opening of said container and their respective second position near said capstan; and
   (f) control means for controlling at least the position of said pinch roller relative to said movable member in accordance with the moved position of said movable member so that, at their respective first position, said pinch roller and said pull-out member are aligned substantially along the opening of said container and, at their respective second position, the pinch roller and said pull-out member are aligned substantially along a pull-out portion of the record-bearing medium pull-out of said pull-out member.

10. The apparatus according to claim 9, wherein said movable member is movable linearly along a first axis and said control means is arranged to align said pinch roller and said pull-out means along a second axis having a first angle relative to said first axis at their respective first positions and to align the pinch roller and the pull-out means along a third axis having a second angle relative to the first axis at their respective second positions, said second angle being smaller than said first angle.

11. The apparatus according to claim 10, wherein said first angle is almost equal to ninety degrees and said second angle is almost equal to zero degrees.

12. The apparatus according to claim 9, further comprising a swingable member having first and second end portions, being attached at the first end portion to said movable member and being swingable about said first end portion, wherein at least said pinch roller is rotatably supported at the second end portion of said swingable member, and said control means is arranged to control the swing action of said swingable member for controlling at least the position of said pinch roller relative to the moved position of said movable member.

13. The apparatus according to claim 12, wherein said control means includes a cam member having a cam surface for controlling at least the position of said pinch roller relative to said movable member in accordance with the moved position of the movable member, and said swingable member further has a cam follower portion for engaging with said cam surface of said cam member.

14. The apparatus according to claim 13, further comprising spring means provided between said movable member and said swingable member for urging the swingable member relative to the movable member so that said cam follower portion of the swingable member engages with the cam surface of said cam member.

15. The apparatus according to claim 14, wherein said pull-out means is supported by a portion of said movable member.

16. The apparatus according to claim 15, wherein said movable member includes a shaft member for swingably supporting said swingable member at its first end portion, and said pull-out means is supported by said shaft member coaxially to the swingable member.

17. The apparatus according to claim 16, wherein said pull-out means includes a rotatable guide roller rotatably supported by said shaft member of said movable member.

18. The apparatus according to claim 14, further comprising urging means for urging said swingable member so as to press said pinch roller onto said capstan against the urging force of said spring means to engage said pinch roller with said capstan when said pinch roller is at said second position.

19. The apparatus according to claim 9, wherein said control means includes a cam member having a cam surface for controlling the position of said pinch roller relative to said movable member in accordance with the moved position of the movable member.

20. The apparatus according to claim 19, further comprising spring means provided between said movable member and said pinch roller for urging the pinch roller relative to said cam member so that the position of the pinch roller relative to the movable member is controlled in accordance with the cam surface of the cam member during the movement of the movable member.

21. The apparatus according to claim 20, further comprising urging means for urging said pinch roller so as to press said pinch roller onto said capstan against the urging force of said spring means to engage said pinch roller with said capstan when said pinch roller is at said second position.

22. A magnetic tape recording and/or reproducing apparatus arranged to use a magnetic tape housed in a tape cassette which is provided with an opening, said apparatus comprising:
(a) a capstan for moving the tape pulled out from the cassette at the exterior thereof;
(b) a pull-out member for pulling out the tape from the cassette;
(c) a pinch roller for pressing the pulled-out tape against said capstan;
(d) a movable member movable for concurrently moving said pull-out member and said pinch roller between their respective first positions within the opening of the cassette and their respective second positions near said capstan, said movable member having a first pin member planted thereon;
(e) a swingable member having first and second end portions and a second pin member provided at the second end portion and swingably attached to said first pin member of said movable member at its first end portion;
(f) said pinch roller being rotatably mounted on said second pin member of said swingable member, and said pull-out member being mounted on said first pin member of said movable member;
(g) moving means for moving said movable member; and
(h) a cam for swinging said swingable member about said first pin member of said movable member in accordance with the moved position of the movable member so that their respective first positions, said pinch roller and said pull-out member are aligned substantially along the opening of the cassette and at their respective second positions, the pinch roller and the pull-out member being aligned substantially along a portion of the tape pulled out by the pull-out member.

23. The apparatus according to claim 22, wherein said swingable member further has a cam follower portion for engaging with said cam, and said apparatus further comprising a spring provided between said swingable member and said movable member for urging the swingable member to engage said cam follower portion with said cam.

24. The apparatus according to claim 23, wherein said movable member is movable linearly along a first axis, and said cam has such a configuration that at their respective first positions, said pinch roller and said pull-out member being aligned along a second axis almost perpendicular to said first axis and at their respective second positions, the pinch roller and the pull-out member being aligned along a third axis almost parallel to said first axis.

25. The apparatus according to claim 23, wherein said pull-out member includes a rotation tape guide roller rotatably mounted on said first pin member of said movable member.

26. The apparatus according to claim 23, further comprising an electric-magnetic member for swinging said swingable member so as to press said pinch roller onto said capstan against the urging force of said spring means to engage said pinch roller with said capstan when said pinch roller is at said second position.

27. A recording and/or reproducing apparatus arranged to use a belt-shaped, record-bearing medium housed in a container which is provided with an opening, said apparatus comprising:
(a) a capstan for moving the record-bearing medium at the exterior of said container;
(b) a pinch roller for pressing the record-bearing medium;
(c) a swingable member for supporting said pinch roller;
(d) a movable member for swingably supporting said swingable member;
(e) moving means for moving said movable member so as to move said pinch roller between a first position within the opening of said container and a second position near said capstan; and
(f) control means for controlling the position of said pinch roller relative to said movable member in accordance with the moved position of said movable member.

* * * * *